(12) United States Patent
Rao et al.

(10) Patent No.: US 7,773,771 B2
(45) Date of Patent: Aug. 10, 2010

(54) VIDEO DATA TRACKER

(75) Inventors: Supriya Rao, Bangalore (IN); Arvind Lakshmikumar, Bangalore (IN); Nalin S. Pradeep, Chennai (IN)

(73) Assignee: Honeywell International Inc., Morristown, NJ (US)

( * ) Notice: Subject to any disclaimer, the term of this patent is extended or adjusted under 35 U.S.C. 154(b) by 1183 days.

(21) Appl. No.: 11/375,897

(22) Filed: Mar. 15, 2006

(65) Prior Publication Data

US 2007/0217654 A1    Sep. 20, 2007

(51) Int. Cl.
G06K 9/00    (2006.01)
(52) U.S. Cl. .................................... 382/103
(58) Field of Classification Search .............. 382/103, 382/170, 226
See application file for complete search history.

(56) References Cited

U.S. PATENT DOCUMENTS

2003/0103647 A1* 6/2003 Rui et al. ............... 382/103

2004/0220769 A1  11/2004  Rui et al.

OTHER PUBLICATIONS

Isard, M., et al., "Condensation—conditional density propagation for visual tracking", *International Journal of Computer Vision, 29(1),* (1998),5-28.
Koller-Meier, E., et al., "Tracking Multiple Objects Using the Condensation Algorithm", *Journal of Robotics and Autonomous Systems, 34,* (Feb., 2001),93-105.
Rui, Yong, et al., "Better proposal distributions: object tracking using unscented particle filter", *Proceedings of the 2001 IEEE Computer Society Conference on Computer Vision and Pattern Recognition, 2001. CVRP, vol. 2,* (2001),II-786-II-793.

* cited by examiner

*Primary Examiner*—Vu Le
*Assistant Examiner*—Claire Wang
(74) *Attorney, Agent, or Firm*—Schwegman, Lundberg, Woessner, P.A.

(57) ABSTRACT

A system tracks multiple moving objects in a stream of video data. In an embodiment, the system uses a combination of video motion detection data and color based data. In another embodiment, the system combines this data into a condensation framework. In yet another embodiment, the integration of the video motion data and the color-based data is done is real time. In further embodiments, the robustness of the tracking is enhanced by applying heuristics.

20 Claims, 2 Drawing Sheets

VIDEO DATA TRACKER

TECHNICAL FIELD

Various embodiments of the invention relate to the tracking of objects in video data.

BACKGROUND

In its simplest form, the tracking of an object or target in a sequence of video images can be described as a system's ability to produce a series of position/location estimates in sequential images, given a target in an image, an initial position/location of the target, and a sequence of subsequent images. In constructing a video tracking system, one may want to consider several issues including the features of the object to be tracked, how the object can be identified (e.g., color, shape, appearance), what are the expected viewing conditions in which the object will appear and be tracked, whether position estimates of the object will be produced in real time, and whether the system will handle situations in which an object temporarily disappears from view. Moreover, additional levels of complexity are added to a tracking system when multiple objects are present in a scene.

To address these issues, many tracking systems include a prediction mechanism. Such a mechanism helps to define the search space in subsequent frames, and if the object becomes occluded, the prediction mechanism can help relocate the object.

In many video processing systems, Kalman filters have been used for object tracking in data signals such as video, radar, and process control signals. A Kalman filter, which belongs to a class of Bayesian filtering techniques, uses a state-space model of the problem which is represented by two basic equations—a state transition equation and a measurement update equation. The state transition equation models how the state of the system evolves through time and the measurement update equation models how the measurement of the system relates to the underlying state. In Kalman filters, the state transition and measurement update equations are constrained to have linear transfer functions and Gaussian noise models. An algorithm known in the art as the condensation algorithm uses stochastic sampling to overcome these constraints. The condensation algorithm describes a sample-based representation of a recursive Bayesian filter. It uses 'factored sampling', in which the probability distribution of possible interpretations are represented by a randomly generated set.

For the tracking itself of objects in video data, as previously mentioned, such features as color, shape, and appearance of an object can be used. In one technique, a video motion detection (VMD) algorithm detects blobs (i.e. shapes) that are moving in a sequence of image frames. The video motion detection algorithm does this by learning the static background of the scene. One or more blobs from the VMD are then tracked through the frames of the video sequence. Another known technique involves the manual identification of an object and tracking thereof using the color(s) of the object. Using only motion blobs would have problems with large objects that move slowly in the field of vision, or in instances where there is start and stop motion. In these cases, the object often gets split into multiple blobs and this can cause problems. In the case of purely color based tracking, initialization of tracks is difficult. The initialization is usually manual or through a method of object segmentation.

Many of the known video tracking techniques still have problems tracking objects in real time, under a changing set of viewing conditions, and when objects disappear and reappear in a scene. Therefore, the video tracking art is in need of a system that can adequately address these issues.

DETAILED DESCRIPTION

Figure 1:
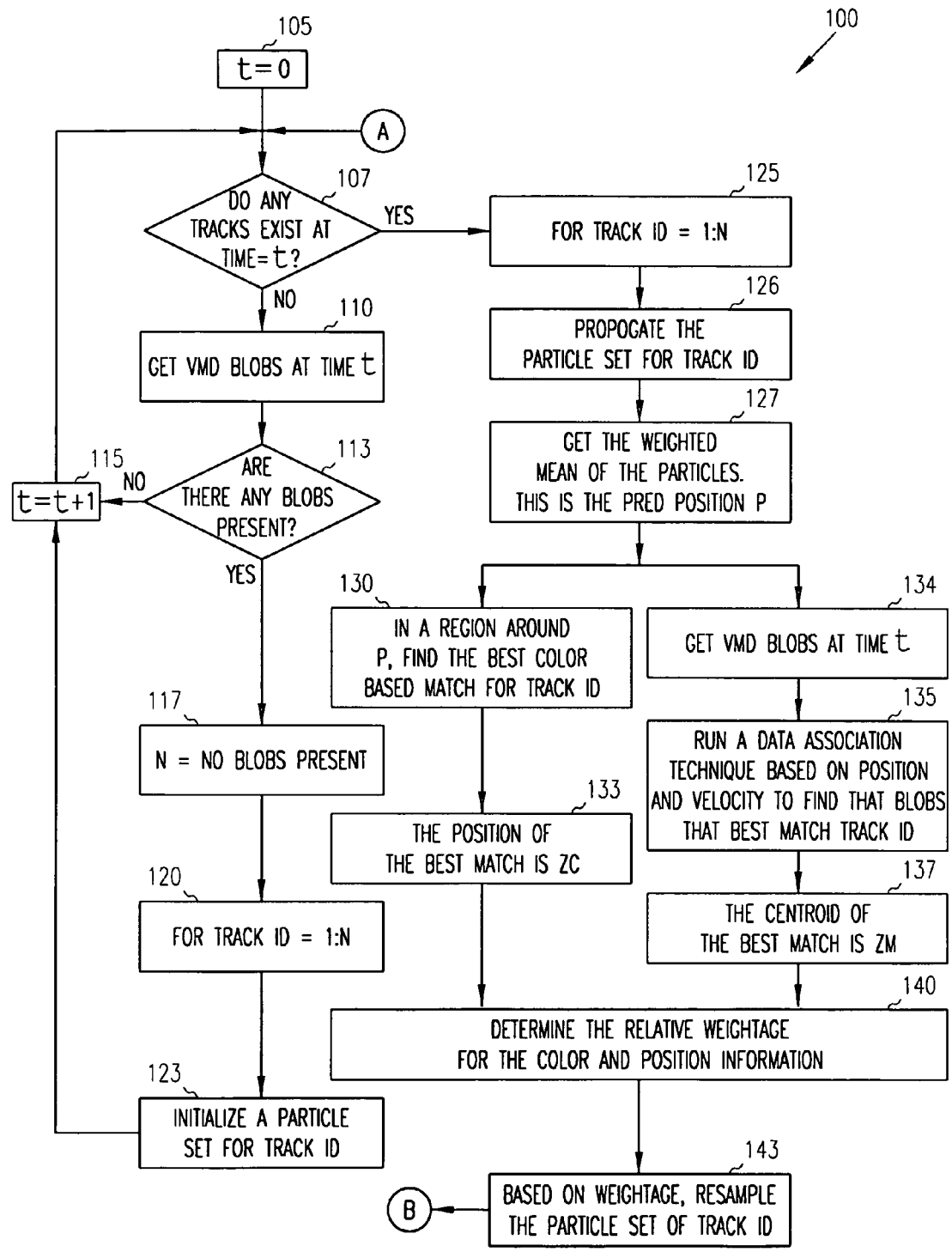
FIGS. 1 and 2 are flowcharts of an example embodiment of a video data tracking system.
Figure 2:
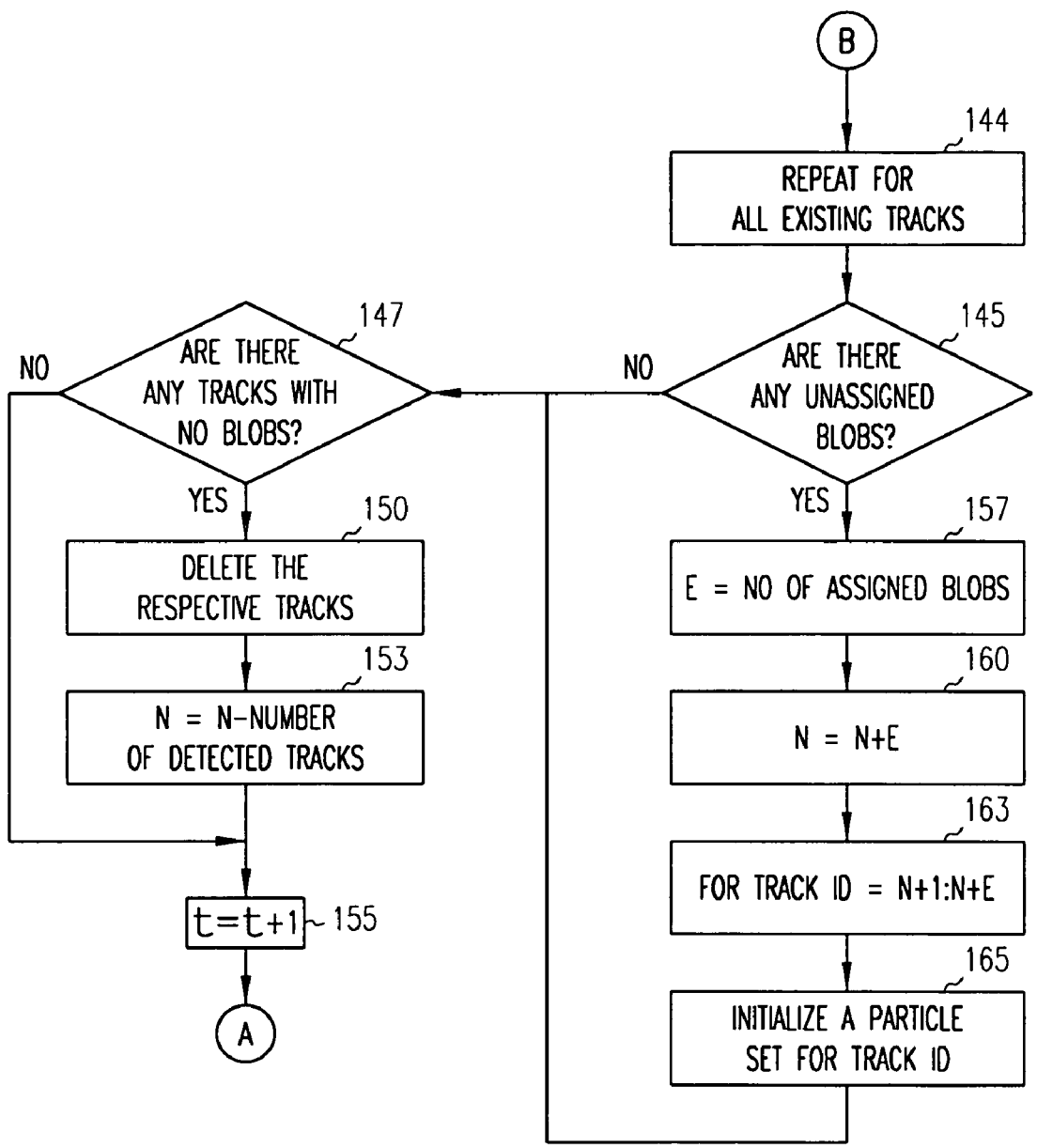

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Object Tracking

An embodiment is a condensation-based video tracking system. In this embodiment, the measurement sources are motion blobs derived from a video motion detection technique (VMD) and a color-based technique. The motion blob technique provides a robust method of initializing a track of an object, and a color-based tracker provides a robust method when the object motion is slow and the size of the tracked object is rather large. Consequently, an embodiment of the invention integrates information from both a motion blob technique and a color-based technique into a condensation framework. In an embodiment, the integration is done in real time, using information that is available at every instant in time.

FIG. 1 illustrates a flow chart of an example embodiment of a system 100 that tracks an object using a combination of motion-based and color-based techniques. The system starts at time zero at 105, and first checks to determine if any tracks exist at time t (107). If no tracks exist, one or more blobs are fetched from a video motion detection algorithm at 110. If there are no blobs present in the image data from the VMD algorithm (113), a time variable is incremented at 115 and the process returns to decision block 107. If there are blobs present at 113, the number of blobs is noted at 117, a track id is created for each blob (120) (i.e., a blob, target, or object is identified in the field of view and is initialized with a track), and the process initializes a particle set for each track id (123). In an alternate embodiment, a track id is not assigned to a track until that track proves reliable for a number of frames.

If there are one or more tracks in existence at 107, then a process of propagation is initiated for each track id (125). Specifically, the particle set for a track id that was initialized at 123 is propagated (126). Propagation information about an object that is associated with a track id is stored in a state vector. The information stored in this vector includes information about the position, velocity, height and width of the object. In an embodiment, the vector may be represented by the following:

$$x_t = \{r_t, c_t, vx_t, vy_t, h_t, w_t\}. \quad \text{Equation No. 1}$$

In Equation No. 1, $r_t$ represents information about the row position of an object in the field of view at a time t, $c_t$ represents information about the column position of an object in the field of view at that time t, $vx_t$ and $vy_t$ represent information about the velocity at time t of the object in the x and y directions respectively, and $h_t$ and $w_t$ represent information about the height and width of the object respectively. As the object moves through the field of vision during a particular time period, the following equations may be used to update the state of the object's vector:

$$r_{t+1} = r_t + vx_t + g1_t \quad \text{Equation No. 2}$$

$$c_{t+1} = c_t + vy_t + g2_t \quad \text{Equation No. 3}$$

$$vx_{t+1} = vx_t + g3_t \quad \text{Equation No. 4}$$

$$vy_{t+1} = vy_t + g4_t \quad \text{Equation No. 5}$$

$$h_{t+1} = h_t + g5_t \quad \text{Equation No. 6}$$

$$w_{t+1} = w_t + g6_t \quad \text{Equation No. 7}$$

In Equation Nos. 2, 3, 4, 5, 6, and 7, gi represents a zero mean noise.

Blobs from the VMD algorithm at time t are fetched (134). A data association is executed based on the position and velocity of the blobs to find the particular blob that best matches the track id that is currently being processed (135). The center position of the blob that best matches the instant track id is tentatively assigned to that track (137).

Also, a particle set is used to determine the location around which a color based search is carried out. One possibility is to search only around the weighted mean of the particles. Alternatively, a search around all the particles whose weight exceeds a predetermined threshold may be executed. The location at which the best match is found constitutes the color based measurement (130). In an embodiment, the color information about an object is derived by construction of a color histogram. A color histogram is suited to this task because of its ability to implicitly capture complex, multi-modal patterns of color. This constructed histogram serves as the color information at time t.

The location and scale at which the best color match is found may be represented by a variable $zc_t$. The measurement derived from the motion detection blob output may be denoted by a variable $zm_t$. Another variable, $z_t$, is chosen to represent the set of all measurements at time t. With this information, an embodiment dynamically evaluates the proper weighting of the densities corresponding to the color information match ($zc_t$) and the motion detection blob output ($zm_t$).

The relative weight to be assigned to the measurements that we get from the two sources may now be decided (127). In an embodiment, the weighting is determined as follows. At any time t, there exists both a current frame as well as the learnt background frame (i.e., learned from preceding frames by the VMD and provided to the tracker). In this embodiment, the current frame is identified as $f_t$, and the learnt or current background as $b_t$. A histogram of a rectangular region surrounding the predicted position or region (of where the object should be) in $f_t$ is constructed. This histogram is represented as $hf_t$. A histogram in the same region (i.e., the rectangular region surrounding the predicted position) of the learnt background frame is constructed. This background histogram is represented as $hb_t$. Also, a histogram of the blob or object itself is calculated. This object histogram is referred to as $ho_t$. The weighting ($\lambda$) is calculated as follows:

$$wt = (KL(ho_t, hf_t))/(KL(ho_t, hb_t)) \quad \text{Equation No. 8}$$

$$\lambda = \begin{cases} Thr1 & \text{if } wt < Thr1 \\ Thr2 & \text{if } wt > Thr2 \\ wt & \text{if } Thr1 < wt < Thr2 \end{cases}$$

Thr1 and Thr2 are two thresholds that specify the minimum and maximum weights that should be assigned to the particles, and $KL(ho_t, hf_t)$ represents the Kullback-Leibler distance between the two histograms.

In cases in which the object is clearly distinguishable from the background, but in which the system has learned that the object is part of the background (e.g., due to slow movement and/or large object size), $KL(ho_t, hb_t)$ is small while $KL(ho_t, hf_t)$ is large. This in turn indicates that $\lambda$ has a large value, and therefore the color based matching is weighted more than the motion based matching. In cases in which the object color matches the background color very closely, then both the color and motion based information are combined with nearly equal weight in the image update.

An observation density is modeled as a two component gaussian mixture:

$$p = \lambda g1(zc_t/x_t) + (1-\lambda)g2(zm_t/x_t)$$

if $p \geq \delta$ then $P(z_t/x_t) = p$ else $P(z_t/x_t) = \delta$. $\quad \text{Equation No. 9}$ In the equations above, g1 and g2 are both gaussian densities. At this point, the particles are re-weighted based on the above observation density.

After the process (125-143) is repeated for all existing track ids (144), the process determines if there are any blobs that are not assigned to a track id (145). If there are not any blobs that are not assigned to a track id, the process then determines if there are any track ids to which no blobs are assigned (147). If there are no such track ids, the time variable is incremented at 155, and the process 100 returns to decision block 107 to determine if any track ids exist at the new updated time. However, if there are one or more track ids for which there are no associated blobs, these track ids are deleted at 150, and the total number of track ids is decremented at 153.

Returning to decision block 145, if there are one or more blobs that are not assigned to a track id, the total number of unassigned blobs is noted (157), and the total number of track ids is incremented by the number of unassigned blobs at 160. Then, for these unassigned blobs, a particle set for track ids is initialized (163, 165). After the initialization, the process branches to decision block 147 to determine if there are one or more track ids that have no blobs associated with them.

Heuristics

In one or more embodiments, several heuristics are invoked in order to make the system's algorithm more robust. In one case, several blobs may correspond to a single measurement (e.g., due to a split in the blobs in the motion detection output). Then, after data association, there may be several unassigned blobs (i.e., not assigned to a track). In one embodiment, the unassigned blobs are used to start new tracks. In another embodiment, if the intersection of the blobs with a current track is larger than a particular threshold, the blob is not used to start a new track but is instead merged with the previous blob that is associated with the current track.

In another case of heuristics, a gating region is defined to decide the position cost matrix. The gating region is made dependent on the velocity of the object, i.e.

$$R \alpha vx^2+vy^2.$$

However, when a track is newly initialized, there is not an accurate estimate of the velocity (related to the burn-in period of the particle filter). Therefore, the gating region is initially set to a large number.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. A non-transitory machine readable medium comprising:
   providing, using a video tracking system, data from a motion blob algorithm;
   providing, using the video tracking system, data from a color based algorithm;
   determining, using the video tracking system, a weight to be associated with a color based matching and a weight to be associated with a motion based matching;
   integrating, using the video tracking system, data from said motion blob algorithm and said color based algorithm into a condensation framework as a function of the weight associated with the color based matching and the weight associated with the motion based matching; and
   tracking, using the video tracking system, an object using said integrated data.

2. A non-transitory machine readable medium comprising:
   determining, using a video tracking system, if a track exists in a video frame;
   fetching, using the video tracking system, one or more blobs from a video motion detection algorithm;
   creating, using the video tracking system, a track id for each of said one or more blobs;
   initializing, using the video tracking system, a particle set for each of said track ids;
   propagating, using the video tracking system, a particle set for each of said track ids;
   determining, using the video tracking system, a weighted mean of said particle set, thereby determining a predicted position of a first blob;
   determining, using the video tracking system, a best color match for a first track id associated with said first blob;
   associating, using the video tracking system, data based on the position and velocity of each of said one or more blobs to determine a blob that best matches a track id being processed;
   determining, using the video tracking system, relative weights of said best color match and said position;
   re-sampling, using the video tracking system, said particle set of said first track id;
   searching, using the video tracking system, said predicted position of each track to determine a color match for a blob associated with each said track;
   associating, using the video tracking system, said one or more blobs and a current track, thereby determining a best match for all tracks; and
   evaluating, using the video tracking system, a proper weight to apply to said best color match and said blob that best matches said track id.

3. The non-transitory machine readable medium of claim 2, further comprising incrementing a time variable and re-determining if any said track exists.

4. The non-transitory machine readable medium of claim 2, further comprising recording the number of said blobs present from said video motion detection algorithm.

5. The non-transitory machine readable medium of claim 2, further comprising refraining from assigning a track id to a track until said track has proved reliable for several frames.

6. The non-transitory machine readable medium of claim 2, wherein said propagation information is stored in a state vector.

7. The non-transitory machine readable medium of claim 6, wherein said propagation information comprises the position of one of said blobs, the velocity of one of said blobs, the height of one of said blobs, and the width of one of said blobs.

8. The non-transitory machine readable medium of claim 2, wherein said determining said weighted mean of said particle set comprises:
   constructing a histogram of a rectangular region surrounding said predicted position in a current frame;
   constructing a histogram of a rectangular region surrounding said predicted position in a background frame;
   constructing a histogram of a blob; and
   determining said weighted mean as follows:

$$wt=(KL(ho_t, hf_t))/(KL(ho_t, hb_t))$$

wherein $$\lambda = \begin{cases} Thr1 & \text{if } wt < Thr1 \\ Thr2 & \text{if } wt > Thr2 \\ wt & \text{if } Thr1 < wt < Thr2; \end{cases}$$

and further wherein Thr1 and Thr2 comprise thresholds specifying minimum and maximum weights assigned to said particle set.

9. The non-transitory machine readable medium of claim 8, further comprising:
determining a value of $\lambda$; and
determining a weight to be assigned to said best color match and said blob that best matches said track id.

10. The non-transitory machine readable medium of claim 2, wherein said determination of said best color match is performed by constructing a histogram.

11. The non-transitory machine readable medium of claim 2, further comprising deleting track ids comprising no associated blobs.

12. The non-transitory machine readable medium of claim 2, further comprising starting a new track id with an unassigned blob.

13. The non-transitory machine readable medium of claim 2, further comprising:
determining if an intersection of one of said blobs with said track exceeds a threshold;
merging said one of said blobs with a previous blob associated with said track.

14. The non-transitory machine readable medium of claim 2, further comprising defining a gating region based on velocity information of the track.

15. The non-transitory machine readable medium of claim 2, further comprising:
determining the direction of movement of said track;
determining a sustained direction of movement of said track over a number of frames; and
validating said track.

16. The non-transitory machine readable medium of claim 2, further comprising:
determining the direction of movement of said track;
determining a sustained direction of movement of said track over a number of frames; and
removing said track.

17. A non-transitory machine readable medium with instructions thereon for executing a process comprising:
providing data from a motion blob algorithm;
providing data from a color based algorithm;
determining a weight to be associated with a color based matching and a weight to be associated with a motion based matching;
integrating data from said motion blob algorithm and said color based algorithm into a condensation framework as a function of the weight associated with the color based matching and the weight associated with the motion based matching; and
tracking an object using said integrated data.

18. The non-transitory machine readable medium of claim 17, further comprising instructions for:
fetching one or more blobs from a video motion detection algorithm;
creating a track id for each of said one or more blobs;
determining a predicted position of a first blob;
determining a best color match for a first track id associated with said first blob;
associating data based on the position and velocity of each of said one or more blobs to determine a blob that best matches a track id being processed;
determining relative weights of said best color match and said position;
searching said predicted position of each track to determine a color match for a blob associated with each said track;
associating said one or more blobs and a current track, thereby determining a best match for all tracks; and
evaluating a proper weight to apply to said best color match and said blob that best matches said track id.

19. The non-transitory machine readable medium of claim 18, further comprising instructions for:
initializing a particle set for each of said track ids;
propagating a particle set for each of said track ids; and
determining a weighted mean of said particle sets.

20. The non-transitory machine readable medium of claim 19, further comprising instructions for:
constructing a histogram of a rectangular region surrounding said predicted position in a current frame;
constructing a histogram of a rectangular region surrounding said predicted position in a background frame;
constructing a histogram of a blob; and
determining said weighted mean as follows:

$$wt = (KL(ho_t, hf_t))/(KL(ho_t, hb_t))$$

wherein $$\lambda = \begin{cases} Thr1 & \text{if } wt < Thr1 \\ Thr2 & \text{if } wt > Thr2 \\ wt & \text{if } Thr1 < wt < Thr2; \end{cases}$$

and further wherein Thr1 and Thr2 comprise thresholds specifying minimum and maximum weights assigned to said particle set.

* * * * *